United States Patent [19]

Schrader et al.

[11] Patent Number: 5,246,262
[45] Date of Patent: Sep. 21, 1993

[54] FOLDING TOP FOR VEHICLE

[75] Inventors: Jürgen Schrader, Weil im Schönbuch; Martin Guckel, Wiernsheim; Helmut Rottler, Aidlingen, all of Fed. Rep. of Germany

[73] Assignee: Mercedes-Benz AG, Fed. Rep. of Germany

[21] Appl. No.: 941,922

[22] Filed: Sep. 8, 1992

Related U.S. Application Data

[63] Continuation-in-part of Ser. No. 933,783, Aug. 24, 1992.

[30] Foreign Application Priority Data

Sep. 5, 1991 [DE] Fed. Rep. of Germany ....... 4129493

[51] Int. Cl.$^5$ .............................................. B60J 1/00
[52] U.S. Cl. ..................... 296/108; 296/116; 296/146.14
[58] Field of Search ............... 296/107, 108, 116, 117, 296/201, 136, 146 L

[56] References Cited

U.S. PATENT DOCUMENTS

| 3,994,524 | 11/1976 | Lehmann | 296/107 |
| 4,573,732 | 3/1986 | Muscat | 296/108 |
| 4,741,571 | 5/1988 | Godette | 296/107 |
| 4,778,215 | 10/1988 | Ramaciotti | 296/107 |

FOREIGN PATENT DOCUMENTS 3416330 11/1985 Fed. Rep. of Germany .
2141389 12/1984 United Kingdom .

Primary Examiner—Robert R. Song
Attorney, Agent, or Firm—Evenson, McKeown, Edwards & Lenahan

[57] ABSTRACT

The invention relates to a folding top for vehicles having a dimensionally stable rear window which, when the top is pushed back, can be folded down from an upright position of use into a stowed position displaced to the rear. Sliding control of the rear window during the stowing operation is provided via a strut of the top frame. The central region of the strut rests against the underneath of the top cover in front of the rear window when the top is closed and overlaps the rear window in its swung-back end position. A coupling device is provided for transmitting movement by means of which the rear window and the strut are connected to one another, in each case at a distance from their pivot axis. In order to make possible a rearward displacement of the rear window when stowing the folding top, largely independently of the lowering of the rear window relative to a material retaining profile, the coupling device includes tie members unstable under bending loads, which connect the rear window in the region of its front window edge to the central region of the strut. After a free movement the tie members are stable under tension only when a final phase of the rearward swinging movement of the strut is reached, after which the rear window participates in the rearward transverse advance of the central region and is moved positively into its pushed-back end position.

16 Claims, 3 Drawing Sheets

FOLDING TOP FOR VEHICLE

BACKGROUND AND SUMMARY OF THE INVENTION

This is a Continuation-in-Part application of U.S. patent application Ser. No. 933783, filed Aug. 24, 1992, pending and based on German Application P 41 28 115.2-21, filed Aug. 24, 1991 in Germany.

The invention relates to a folding top for vehicles having a dimensionally stable rear window which can be folded down from an upright in-use position to a stowage position when the top is lowered to its stowage position.

A folding top of this kind can be taken as already known from German published patent application DOS 3,416,330, the extremely large-sized rear window extending into the roof surface of the top and sharing the tightening function of a corner strut. In accordance with its function as a supporting frame, the rear window is attached to the bodywork of the vehicle along its rear window edge by means of a rigid multi-element guide device, as a result of which the rear window can be pivoted about a horizontal transverse axis of the vehicle and is at the same time mounted in a manner which allows limited displacement towards the rear.

To stretch the top cover over the rear window, a buckle-proof connecting-rod arrangement is provided, the two connecting rods of which are each articulated on the side of the rear window and, with their opposite ends, on the associated top pillar of a main strut. The articulation conditions of the connecting-rod arrangement are here chosen in such a way that the stowing movement of the rear window is controlled as a function of the swing-back movement of the main strut during the folding back of the top.

Since the connecting rods are displaced forwards during the swinging back of the main strut counter to the folding direction of the latter, the first thing that happens during this process is that the top cover relaxes, with the result that the rear window is free. Due to the lead weight of the rear window, two plates of the guide device, connected to one another toggle-lever fashion, then fold one on top of the other, the articulatedly coupled rear window being lowered and the rear window simultaneously being displaced rearwards. As the main strut is swung back further, the forward advance of the connecting rods continues, the rear window thereby being gradually folded down into its stowed position.

In the case of the known folding top, there is thus a direct connection between the distance by which the rear window is lowered and the distance by which it can be displaced rearwards during this process.

In order to provide a better view over the tail or rear end of the vehicle with the folding top closed, it would be desirable per se to have the lower edge side of the rear widow extend as close as possible to the material retaining profile arranged approximately at the height of the top edge of the vehicle side. Since, in this case, it would not be possible to lower the rear window significantly relative to the material retaining profile, the rearward displacement of the rear window desired for reasons of space would no longer be readily achievable either.

An object on which the invention is based is to further develop a folding top of the generic type such that rearwards displacement of the rear window into a space-saving stowed position remains possible largely independently of the amount by which the rear window is lowered relative to the material retaining profile in the course of its stowing movement.

This object is achieved according to the invention by providing an arrangement including a top cover of foldable textile material or the like, a dimensionally stable rear window, supported at the top cover and disposed in an opening of the top cover, a top frame including a movable first strut which supports the top cover in front of the rear window when the top is in its top closed in-use position and which is disposed to overlap the rear window when the top is in its open stowed position, and a coupling device connecting the rear window and first strut s that movement of the first strut towards the stowed position results in rearward movement of the rear window, wherein said coupling device includes a tie member which is unstable under bending loads, said tie member connecting the rear window in a region of its front window edge to a central region of the first strut, said tie member becoming stable under tension only during a final phase of rearward swinging movement of the first strut, whereby further swinging movement of the first strut results in positive rearward movement of the rear window into its pushed-back end stowage position.

The stowing movement of the rear window is expediently controlled by a corner strut of conventional type since this has the smallest pivoting angle relative to the rear window of all the struts of the top frame. As a result, it is possible to use particularly short tie means.

A flexible control strap is particularly suitable as a tie means since it is distinguished by a low dead weight and requires only a small installation space. In contrast to link chains or link belts having a metal matrix, there is virtually no risk of scratch damage to the rear window if a control strap made of textile material is used. Control straps with a low intrinsic elongation are as such known.

Particularly with heavy rear windows made of mineral glass or the like, a uniform rearward displacement of the rear window can be ensured with an arrangement comprising a plurality of parallel control straps.

It is possible, despite the control straps, for the upper window edge of the rear window to be held up by retention straps which, crossing the central region of the corner strut, rest on the central tube and are stretched over the corner strut.

The corner strut, for its part, can advantageously be controlled automatically in its pivoting by the tightening advance of positioning straps.

Particularly simple articulation of the rear window on the material holding profile which nevertheless permits rearward displacement of the rear window can be achieved by means of a narrow fabric strip of the top cover which acts as a film hinge.

As the material retaining profile, the folding top according to the invention can have a pivotable material retaining hoop and be capable of being retracted into an associated top stowage box. By virtue of the rearward displacement of the rear window in its stowed position, the opening of the top stowage box can here have particularly narrow dimensions and the cross-sectional length of the top storage box in the region in which the stowed rear window is arranged need be only slightly greater than the longitudinal extent of the rear window itself.

The control straps are preferably each formed by an extension of a retention strap, as a result of which one retention point on the rear window for common attachment is sufficient.

Other objects, advantages and novel features of the present invention will become apparent from the following detailed description of the invention when considered in conjunction with the accompanying drawings.

DETAILED DESCRIPTION OF THE DRAWINGS

Figure 1:
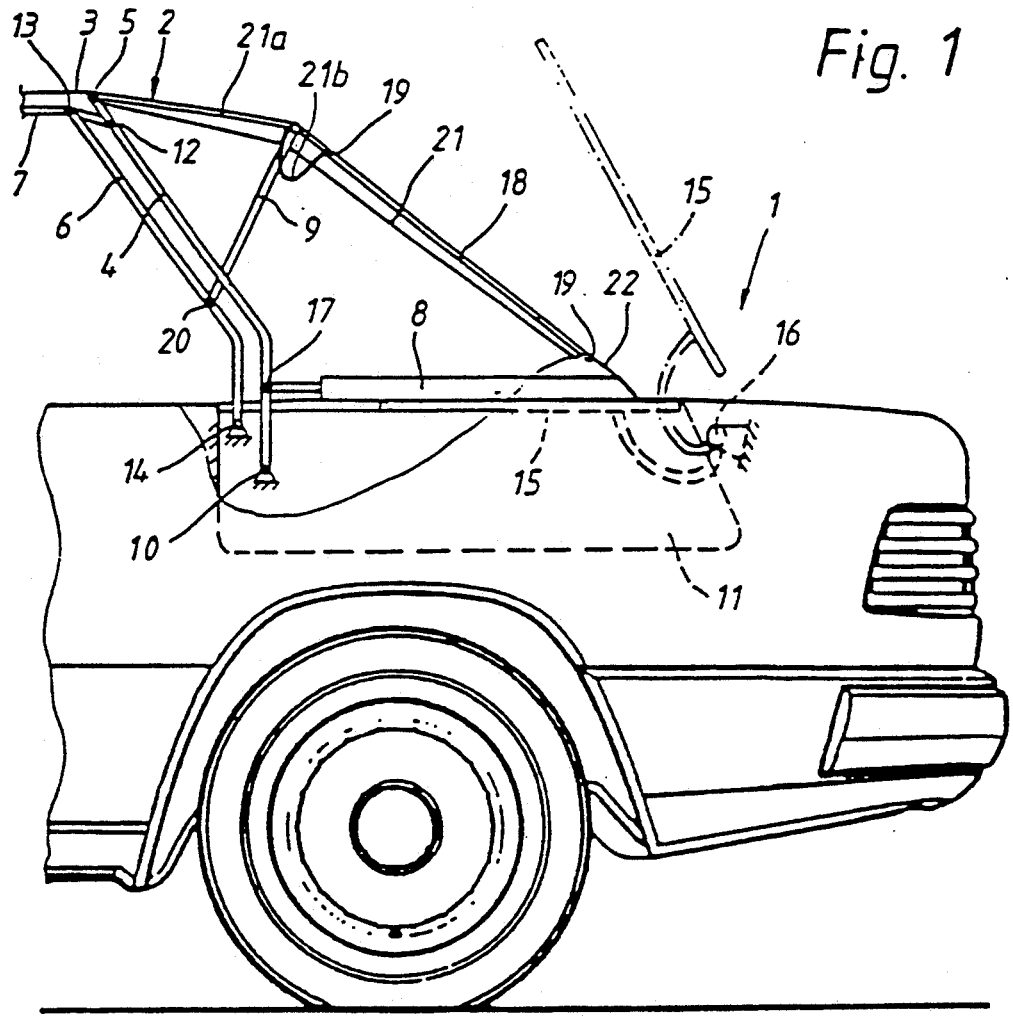
FIG. 1 is a side view of a tail region of a convertible car with the folding top closed showing a folding top constructed in accordance with a preferred embodiment of the invention.

In the side view according to FIG. 1, a tail region of a convertible car 1 with a retractable folding top 2 can be seen, comprising in a customary manner a supporting top frame over which is stretched a flexible top cover 3 of textile fabric of a known type.

In the rear region essential to the invention, the following parts of the top frame, which is mirror-symmetrical in relation to the longitudinal median plane of the convertible car 1, can be seen: a top pillar 4 of the main strut 5, a main connecting rod 6, a lateral roof frame 7, a material retaining hoop 8 and a corner strut 9. The lower end of the top pillar 4 is attached to the bodywork of the convertible car 1 in a recessed manner via a main bearing 10 in the lateral leg of a top stowage box 11 having the overall shape of a U, thereby allowing the main strut 5 to be pivoted about a horizontal transverse axis of the vehicle. In the upper end region of the top pillar 4, a rear end of the roof frame 7 is connected to the top pillar 4 via hinge joint 12. The roof frame 7 is retained in its design position by the associated main connecting rod 6 whose upper end is articulated on the roof frame 7 via a hinge joint 13 located at a distance in front of and, at the same time, above the hinge joint 12. The lower end of the main connecting rod 6, which extend approximately parallel to the top pillar 4, is attached to the bodywork via a hinge bearing 14 in the top stowage box 11, with a similar vertical offset. Thus the roof frame 7 is guided by the top pillar 4 and the main connecting rod 6 in the manner of a parallelogram linkage.

The upward-facing opening of the top stowage box 11 is closed by means of a matchingly shaped top box lid 15, which rests on the edge of the aperture of the top stowage box 11 and is locked thereto in a manner not shown. On the top box lid 15 lies the likewise U-shaped material retaining hoop 8, which forms the lower termination of the top 2 and retains the top cover 3 at the rear. While the top box lid 15 is mounted behind the top stowage box 11 to be pivotable about an axle 16 fixed to the bodywork, the front ends of the lateral legs of the material retaining hoop 8 are cantilever-mounted via a hinge joint 17 on the associated top pillar 4, approximately at the height of the upper edge of the vehicle side at the rear, the material retaining hoop 8 is locked to the top box lid 15 by a catch arrangement (not shown) and is thus held down in its illustrated bearing position.

Above the material retaining hoop 8 is a large-sized rear window 18, inset into a rear window aperture in the top cover 3 and retained (in a manner not shown in detail) in a window frame 19 which is connected all the way round the top cover 3 enclosing it. Situated above the rear window 18 is the corner contour of the top 2, where the central tube 9a of the corner strut 9 bears supportingly on the underside of the top cover 3. The lateral legs of the corner strut 9, which, overall, has the shape of a U, extend approximately at right angles to the oblique plane of the rear window, forwards and downwards, and are articulated by their ends on the associated main connecting rod 6 via a hinge joint 20. The corner strut 9 is thereby supported in a manner which allows it to pivot relative to the top cover 3 and to the main connecting rods 6. The corner strut 9 is retained in its illustrated supporting position by two positioning straps 21 of low lengthwise extensibility, each of which is connected to a flank of the corner strut 9, extends under the top cover 3 in the longitudinal direction of the vehicle, and is stretched forwards towards the main strut 5 and rearwards towards the material retaining hoop 8, where its respective ends are fixed. Above the rear window 18, the window frame 19 is furthermore connected to the central tube of the main strut 5 via a plurality of retention straps 21a comprising flexible bands and having similar extensibility properties to the positioning straps 21.

The retention straps 21a, which are likewise tautly stretched, rest on the central tube of the corner strut 9, without fixing, and prevent the weight of the rear window 18 from having to be taken exclusively by the top cover 3.

Figure 2:
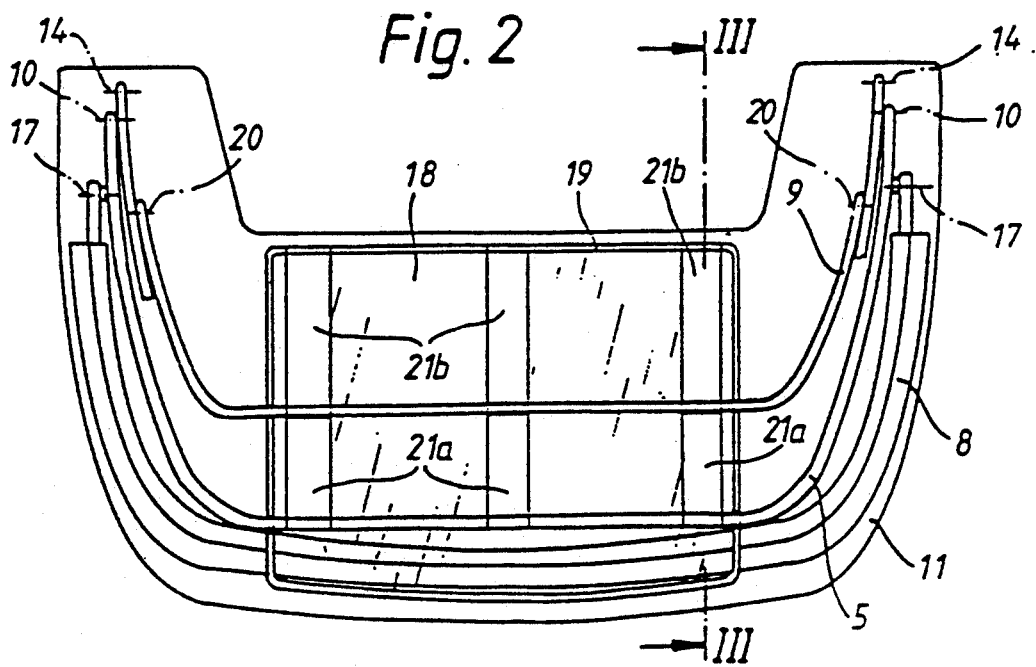
FIG. 2 is a plan view of the top stowage box of the convertible car of FIG. 1 with the folding top stowed.
Figure 3:
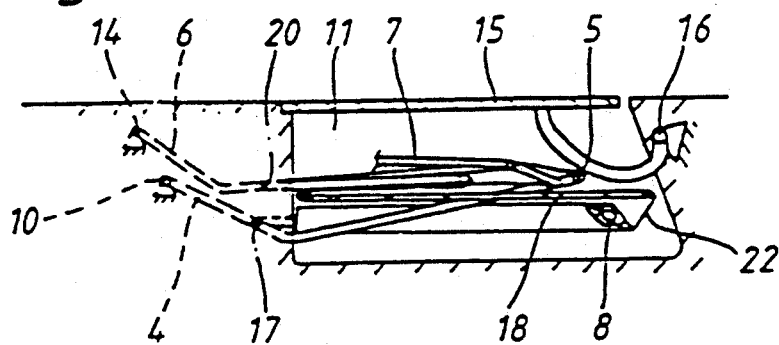
FIG. 3 is a longitudinal sectional view through the top stowage box taken along section III—III in FIG. 2.

In order to open the folding top 2, it is first necessary to release front top catches which connect the front roof part (not shown) to the windscreen frame. The locking of the material retaining hoop 8 on the top box lid 15 is then released and the material retaining hoop 8 is swung forwards about the hinge joint 17 of the top pillar 4, which is still upright, after which the top box lid 15, mounted in the opposite direction, is free and, after being unlocked, can be swung upwards and rearwards into the open position indicated by broken lines. The folding top 2 can be swung around the main bearing 10 into the open top box 11 until it reaches its stowed position of non-use, which is shown in FIG. 3. During this procedure, the rear window 18 is folded down and stowed between the central tube of the main strut 5 and the material retaining hoop 8, after which it rests on the top of the material retaining hoop 8. As can be recognized in connection with the simplified plan view according to FIG. 2, the clear cross-section of the top stowage box 11 in the central region which receives the rear window 18 is only slightly longer than the rear window 18 itself. This creates the requirement that, in the course of the process of retracting the top 2, the rear window 18 should not only be folded down along a pivot axis extending below the lower window edge but should, in addition, be displaced rearwards to the rear edge of the material retaining hoop 8, the pivot axis having to be simultaneously displaced transversely to its longitudinal extent.

The transversely displaceable axis of articulation is here formed by a narrow fabric strip 22 of the top cover 3 itself, which acts as a film hinge. For this purpose, the fabric strip 22 is connected to the lower edge side of the rear window 18 along one lengthwise side via the window frame 19. With its opposite edge side, the fabric strip 22 is fixed along the underside of the material retaining hoop 8, enclosing the shaping circumference of the material retaining hoop 8 without being fixed. The shaping circumference is here considered to be the oblique circumferential surface of the material retaining hoop profile, which is wedge-shaped in cross-section, this surface extending approximately parallel to the inclination of the rear window 18 when the top 2 is closed. During the rearward displacement of the rear window 18 relative to the material retaining hoop 8, the length of the fabric strip 22 which previously rested on the circumference of the hoop 8 is lifted free and guides the lower edge side of the rear window 18 rearwards, approximately parallel to the upper side of the material retaining hoop 8. It is thus possible to dispense with additional guide devices for the lower edge side of the rear window 18.

When the top 2 is closed, the lower corners of the rear window 18 lie very close to the upper side of the material retaining hoop 8, so that no major downward movement of the lower edge side of the rear window 18 towards the material retaining hoop 8 ca take place. Instead, the free width of material of the fabric strip 22 is just sufficient to form a reliable film hinge when the rear window 18 is folded down.

In order to ensure that no partial over-extension of the top cover 3 can occur when the rear window 18 is displaced rearwards into its stowed position of non-use, the top cover is provided on both sides of the rear window 18 with a fabric zone of variable length which, When the top cover 2 is stowed, move apart as a result of the rearward displacement of the rear window 18 relative to the material retaining hoop 8, and automatically shorten again to their initial length when the top 2 is erected into the closed position of use.

These two fabric zones are designed as mirror-symmetrical fabric folds 23 which, when the top 2 is closed, are held in a tautened overlapping position by means of tensile forces in the top cover 3.

Figure 4:
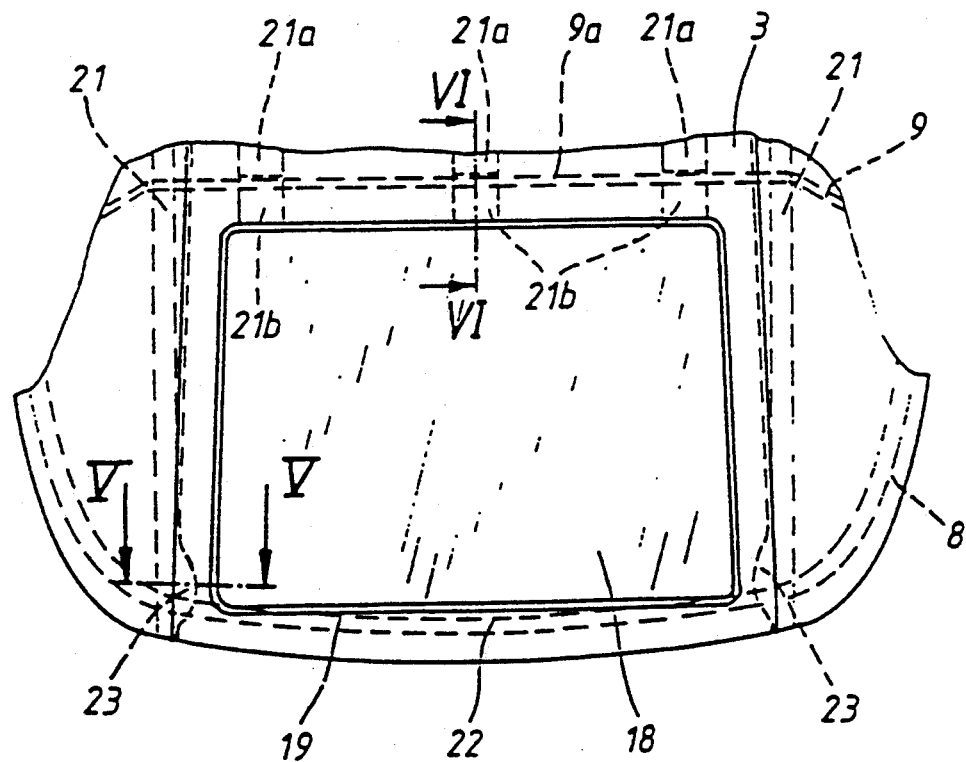
FIG. 4 is a perspective view of the closed folding top shown as viewed from behind with a fold arrangement of the top cover.

As is apparent in FIG. 4, the fabric folds 23 are each located at a lateral distance from the lower corners of the rear window 18, and extend, viewed in the vertical direction, over the width of the fabric strip 22 and a fabric region of the top cover 3 adjacent thereto, close to the associated side edge of the rear window 18. Viewed in the longitudinal direction, that is to say the direction of circumferential stress of the top cover 3, the fabric fold 23 has its greatest fold width approximately at the height of the associated window corner, the fold width gradually decreasing both upwards and downwards.

Figure 5:
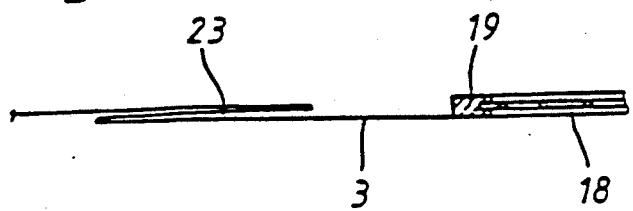
FIG. 5 is a sectional view through a fabric fold of the fold arrangement taken along section V—V in FIG. 4.

As can be seen in connection with FIG. 5, the fabric fold 23 results in an overlap of the top cover 3, allowing largely unhindered rearward displacement of the rear window 18.

In order to ensure that the rear window 18 is displaced positively and automatically into its end position during the process of retracting the folding hood 2, the central tube 9a of the corner strut 9 is connected via three control straps 21b to the front edge side of the rear window 18, the straps 21b extending parallel to one another in the longitudinal direction of the vehicle. One of these control straps 21b is connected to the window frame 19 in the middle of the width of the rear window 18 and hence fixed to the rear window 18. The other two control straps 21b are each connected to the window frame 19 at a lateral distance from the central control strap 21b. By virtue of their arrangement, the control straps 21b are each in alignment in the longitudinal direction of the convertible car 1 with the retention straps 21a connected to the central tube of the main strut 5.

Figure 6:
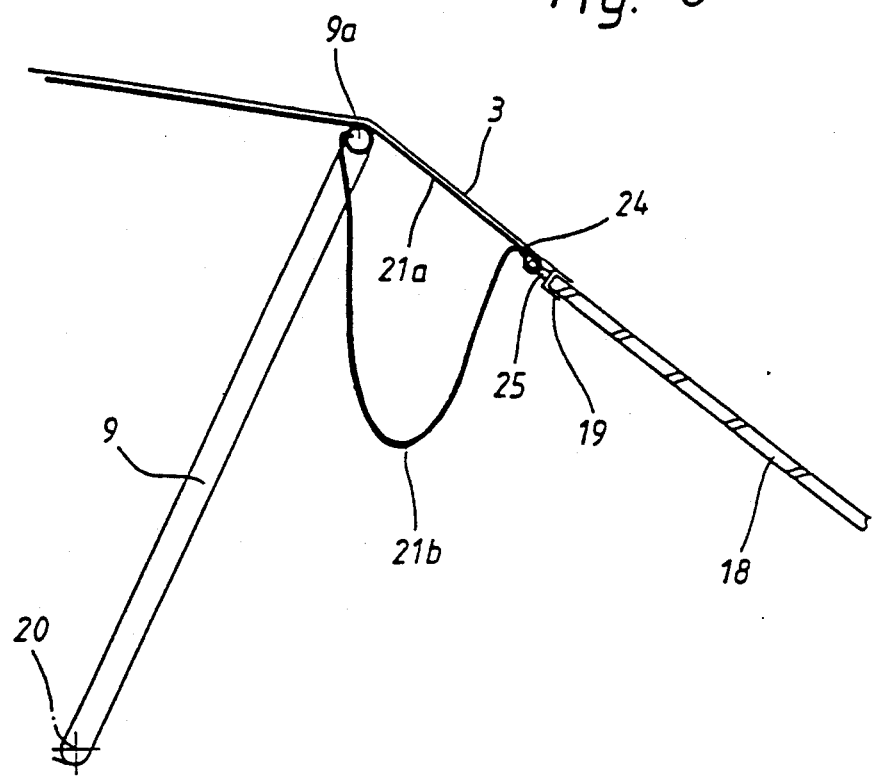
FIG. 6 is a longitudinal sectional view through a control strap taken along section VI—VI in FIG. 4.

As is evident in FIG. 6, the retention straps 21a merge integrally into the control straps 21b, the control straps 21b thereby in each case being formed by an extension of the associated retention strap 21a. In this arrangement, the transition zone between the retention strap 21a and the control strap 21b is folded over to form a loop and the loop is fixed by a connecting seam 24 between both straps. For the purpose of attachment, the loop enfolds a U-shaped retaining hoop 25 which is connected to the window frame 19 and projects from the upper peripheral side of the latter. Via this loop connection, the rear ends of the retention strap 21a and the control strap 21b are thus fixed on the retaining hoop 25 in a manner which is flexible but prevents axial movement. When the folding top 2 is closed, the retention straps 21a are stretched taut and pull the rear window 18 upwards in the direction of extension of the plane of the rear window, resting against the underneath of the likewise tautly stretched top cover 3 and, in enfolding an upward-facing peripheral region of the strut tube 9a, rest against the corner strut 9.

To ensure that the support of the retention straps 21a on the strut tube 9a is not impaired, the front end of the control straps 21b is passed through the strut arch underneath the strut tube 9a and is connected to the strut tube 9a on the forward-facing peripheral surface by screws or other releasable fastening means.

Figure 7:
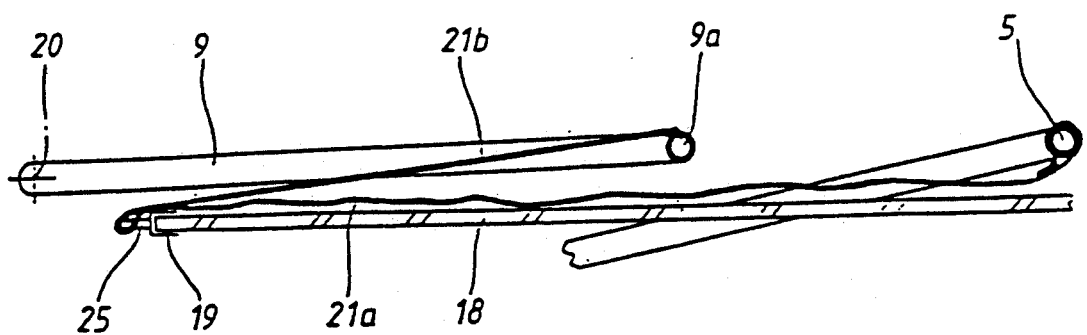
FIG. 7 is a longitudinal sectional view through the control strap of FIG. 6 with the top stowed.

When the top 2 is closed, however, the control straps 21b are not stretched but have a defined excess length which ensures that they come into action only in a final phase of the rearward swinging movement of the corner strut 9 when then top 2 is retracted. As the top 2 is lowered into the top stowage box 11, the rear window 18 is folded down onto the material retaining hoop 8 in the manner already described and the central tube of the main strut 5 laid over it. During this process, the corner strut 9 is taken along by the main connecting rods 6, which are constrained to take part in the rearward swinging movement of the main strut 5, and swung about hinge bearing 14. In order to achieve a space-saving stowed position, the corner strut 9 must furthermore be swung about the hinge joints 20, i.e. relative to the main connecting rods 6, until it lies essentially in a plane parallel to the plane of the stowed rear window 18, the central tube 9a being displaced transversely rearwards in this last phase of the rearward swinging movement of the corner strut 9, in the process almost resting on the stowed rear window 18. When this last phase of the rearward swinging movement is reached, the free movement of the control straps 21b due to the excess length has, however, been used up, after which the control straps 21b are taut, such that they are stable under tension, and the central tube 9a is thus motionally coupled to the rear window 18. As a result, the rear window 18 participates in the rearward advance of the central tube 9a and is pushed back into the end position indicated in FIG. 7 and held in the latter. The slack retention straps 21a are stowed underneath the central tube 9a, on the rear window 18.

When the folding top 2 is closed again, the main strut 5 is swung back up into its erect end position, the rear window 18 being taken along by the tautening retention straps 21a. After the material retaining hoop 8 has been swung up, the hood box lid 15 can be shut and the material retaining hoop 8 can then be swung back into the position in which it rests on the hood box lid 15 the distance between the central tube of the main strut 5 and the rear end of the material retaining hoop 8 increasing.

Due to this increase in the distance, the retention straps 21a and the positioning straps 21 are increasingly tightened, with the result that the corner strut 9 moves automatically into its supporting position of use due to the tightening advance of the positioning straps 21, and the rear window 18 assumes its design position. Once the material retaining hoop 8 has been locked, the original position of the control straps 21b, which ensures their functionally necessary free movement, has thus been reached again too.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. Folding top for motor vehicles which can be folded down from an upright top closed position of use into a flat stowed position of non-use with the top opened, said top comprising:
   a top cover of foldable textile material or the like,
   a dimensionally stable rear window, supported at the top cover and disposed in an opening of the top cover,
   a top frame including a movable first strut which supports the top cover in front of the rear window when the top is in its top closed in-use position and which is disposed to overlap the rear window when the top is in its open stowed position,
   and a coupling device connecting the rear window and . first strut so that movement of the first strut towards the stowed position results in rearward movement of the rear window,
   wherein said coupling device includes a tie member which is unstable under bending loads, said tie member connecting the rear window in a region of its front window edge to a central region of the first strut, said tie member becoming stable under tension only during a final phase of rearward swinging movement of the first strut, whereby further swinging movement of the first strut results in positive rearward movement of the rear window into its pushed-back end stowage position.

2. Folding top according to claim 1, wherein the first strut is a corner strut and wherein the tie member is connected to a central tube of the corner strut.

3. Folding top according to claim 2, wherein the tie member is a flexible control strap which extends in the longitudinal direction of the vehicle and is fixed at one end to the central tube of the corner strut and at the other end to the front window edge of the rear window, the length of the control strap being such that it is only stretched taut when the last phase or the rearward swinging movement of the corner strut is reached.

4. Folding top according to claim 3, comprising a plurality of tie member control straps arranged distributed over the width of the rear window.

5. Folding top according to claim 1, comprising retention straps for supporting the rear window at its upper window edge by tensile forces of the retention straps when the top is closed,
   wherein the top frame includes a second strut which is a main strut which supports the top cover in its top closed position, and
   wherein the retention straps connect a central tube of the main strut to the rear window and are stretched taut by virtue of support on the first strut which is corner strut.

6. Folding top according to claim 2, wherein the top frame includes lateral positioning struts,
   and wherein the corner strut is automatically swung into its position of use by the tightening advance of the lateral positioning struts as the folding top is closed.

7. Folding top according to claim 1, wherein the rear window is held along its lower edge side by a narrow fabric strip of the top cover which guides the rear window in the manner of a film hinge and holds it displaceably as it is folded down onto a material retaining profile hoop forming the lower termination of the top.

8. Folding top according to claim 1, comprising a top stowage box, wherein the folding top can be retracted into the top stowage box, said stop stowage box being covered by means of a top box lid, and wherein a material retaining hoop profile is pivotably mounted on the top frame.

9. Folding top according to claim 5, wherein each tie member control strap is formed by an extension of a respective one of the retention straps.

10. Folding top according to claim 3, comprising retention straps for supporting the rear window at its upper window edge by tensile forces of the retention straps when the top is closed,
    wherein the top frame includes a second strut which is a main strut which supports the top cover in its top closed position, and
    wherein the retention straps connect a central tube of the main strut to the rear window and are stretched taut by virtue of support on the first strut which is corner strut.

11. Folding top according to claim 5, wherein the top frame includes lateral positioning struts,
    and wherein the corner strut is automatically swung into its position of use by the tightening advance of the lateral positioning struts as the folding top is closed.

12. Folding top according to claim 5, wherein the rear window is held along its lower edge side by a narrow fabric strip of the top cover which guides the rear window in the manner of a film hinge and holds it displaceably as it is folded down onto a material retaining profile hoop forming the lower termination of the top.

13. Folding top according to claim 5, comprising a top stowage box, wherein the folding top can be retracted into the top stowage box, said stop stowage box being covered by means of a top box lid, and wherein a material retaining hoop profile is pivotably mounted on the top frame.

14. Folding top according to claim 11, wherein the rear window is held along its lower edge side by a narrow fabric strip of the top cover which guides the rear window in the manner of a film hinge and holds it displaceably as it is folded down onto a material retaining profile hoop forming the lower termination of the top.

15. Folding top according to claim 14, comprising a top stowage box, wherein the folding top can be retracted into the top stowage box, said stop stowage box being covered by means of a top box lid, and wherein a material retaining hoop profile is pivotably mounted on the top frame.

16. Folding top according to claim 15, wherein each tie member control strap is formed by an extension of a respective one of the retention straps.

* * * * *